(12) United States Patent
Suzuki

(10) Patent No.: US 10,977,769 B2
(45) Date of Patent: Apr. 13, 2021

(54) ELECTRONIC DEVICE, MOVEMENT PATH RECORDING METHOD, AND COMPUTER-READABLE STORAGE MEDIUM

(71) Applicant: CASIO COMPUTER CO., LTD., Tokyo (JP)

(72) Inventor: Miki Suzuki, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/120,805

(22) Filed: Sep. 4, 2018

(65) Prior Publication Data
US 2019/0096030 A1 Mar. 28, 2019

(30) Foreign Application Priority Data

Sep. 27, 2017 (JP) ................................ 2017-185665

(51) Int. Cl.
| | | |
|---|---|---|
| *G06T 3/20* | (2006.01) | |
| *G09G 5/37* | (2006.01) | |
| *G09G 5/42* | (2006.01) | |
| *G09G 5/20* | (2006.01) | |
| *G09B 19/02* | (2006.01) | |
| *G09G 5/22* | (2006.01) | |
| *G09B 5/02* | (2006.01) | |

(52) U.S. Cl.
CPC ............... *G06T 3/20* (2013.01); *G09B 5/02* (2013.01); *G09G 5/20* (2013.01); *G09G 5/37* (2013.01); *G09G 5/42* (2013.01); *G09B 19/025* (2013.01); *G09G 5/22* (2013.01); *G09G 2340/0464* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 5,724,499 | A * | 3/1998 | Nishiyama | G11B 27/034 345/473 |
| 5,836,666 | A * | 11/1998 | Aoyama | G06F 15/0225 353/122 |
| 8,164,578 | B2 * | 4/2012 | Okamura | G06F 3/038 345/173 |
| 2002/0188356 | A1 * | 12/2002 | Paroz | G05B 19/4103 700/63 |

(Continued)

FOREIGN PATENT DOCUMENTS

JP 63103354 A 5/1988

*Primary Examiner* — James A Thompson
(74) *Attorney, Agent, or Firm* — Holtz, Holtz & Volek PC

(57) ABSTRACT

Processor displays avatar to move from a starting coordinate to first movement destination coordinates in accordance with each instruction in first instruction set. Processor records coordinates after movement by instructions in the first instruction set, as first group, in accordance with instruction included in the first instruction set. Processor returns avatar to the before starting movement coordinates and displays avatar. Processor displays avatar to move from the before starting movement coordinates to second movement destination coordinates in accordance with each instruction in second instruction set. Processor records coordinates after movement by instructions in the second instruction set.

21 Claims, 9 Drawing Sheets

(56) References Cited

U.S. PATENT DOCUMENTS

| | | | |
|---|---|---|---|
| 2003/0112254 A1* | 6/2003 | Ishihara | G06T 11/40 345/620 |
| 2010/0050102 A1* | 2/2010 | Baba | G06F 3/04817 715/765 |
| 2011/0276909 A1* | 11/2011 | Nakaishi | G06F 3/04847 715/764 |
| 2013/0113824 A1* | 5/2013 | Kai | G06T 11/206 345/629 |
| 2017/0219358 A1* | 8/2017 | Rolf | G01C 21/30 |
| 2017/0255895 A1* | 9/2017 | Kozumi | H04N 7/185 |
| 2018/0180428 A1* | 6/2018 | Grimm | G08G 3/02 |
| 2018/0315134 A1* | 11/2018 | Amitay | H04L 51/20 |

* cited by examiner

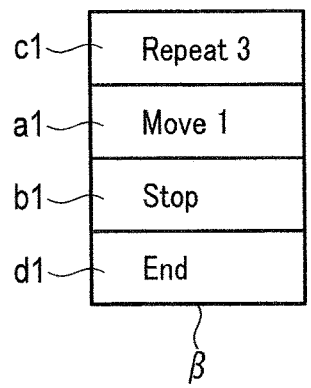
FIG. 6
| A=1 | same | B=0 | same |
| C=2 | same | D=0 | same |
| E=3 | same | F=0 | same |
FIG. 7A
| A=1 | (±0) | B=0 | (±0) |
| C=2 | (±0) | D=0 | (±0) |
| E=3 | (±0) | F=0 | (±0) |
FIG. 7B
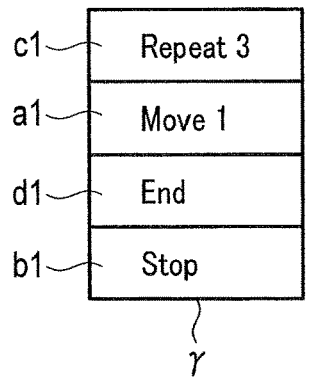
FIG. 8

A=3 > B=0 same — 12
FIG. 9A
A=3 (+2) B=0 (±0) — 12
FIG. 9B
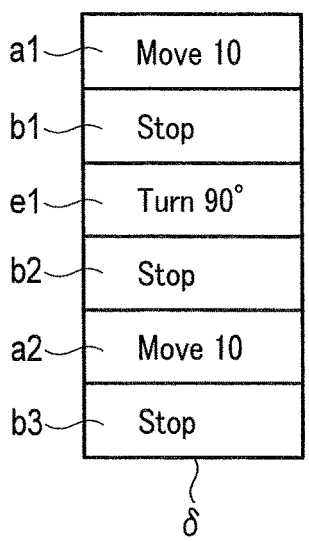
FIG. 10A
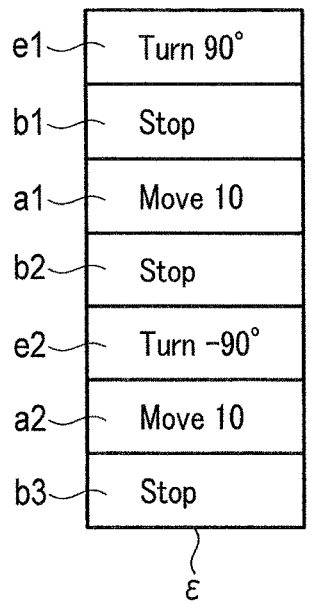
FIG. 10B
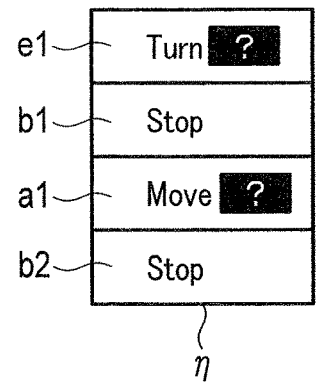
FIG. 10C
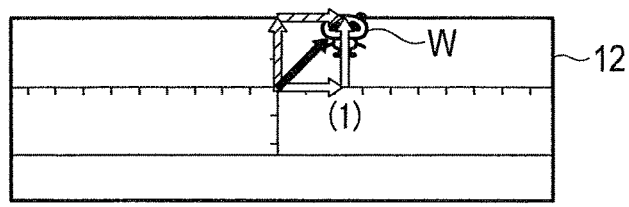
FIG. 11

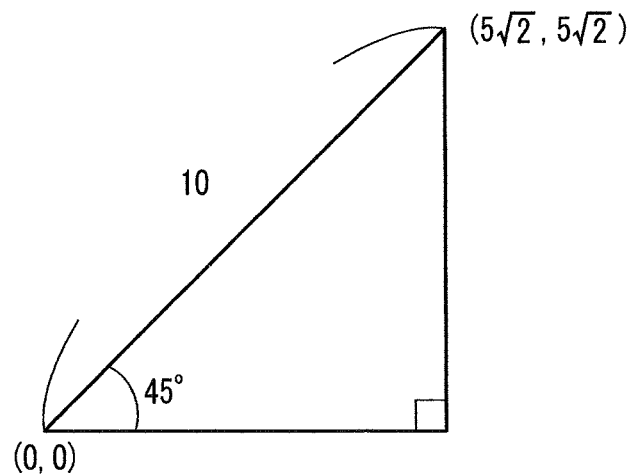
FIG. 16
```
A=0      same    B=0      same
C=5√2     <      D=5√2     >         — 12
```
FIG. 17
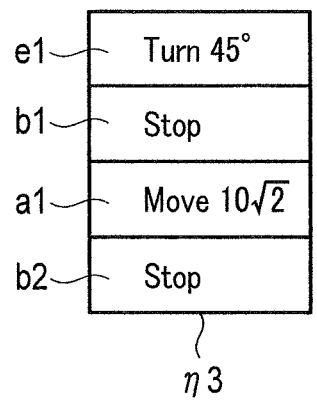
FIG. 18

| A=0 | same | B=0 | same | |
|-----|------|-----|------|---|
| C=10 | > | D=10 | > | ~12 |

ELECTRONIC DEVICE, MOVEMENT PATH RECORDING METHOD, AND COMPUTER-READABLE STORAGE MEDIUM

CROSS-REFERENCE TO RELATED APPLICATIONS

This application is based upon and claims the benefit of priority from Japanese Patent Application No. 2017-185665, filed Sep. 27, 2017, the entire contents of all of which are incorporated herein by reference.

BACKGROUND OF THE INVENTION

1. Field of the Invention

The technical field relates to an electronic device including a display, such as a graph function electronic calculator, a movement path recording method of an avatar moved by the electronic device, and a computer-readable storage medium recording a program regarding the movement path recording method of the avatar.

2. Description of the Related Art

Conventionally, a graph function electronic calculator is an electronic calculator capable of drawing a graph, calculating simultaneous equations, and performing a computation using a variable. The graph function electronic calculator of this kind includes a display, and is also capable of displaying multiple lines of text or a graph of a calculation result on the display.

As above, since the graph function electronic calculator includes a display, use in programming education has also been considered in recent years.

If it is assumed that a graph function electronic calculator is used for programming education, for example, a use as equipment for learning algorithms can be considered as a use of the graph function electronic calculator. In the case of this use, the graph function electronic calculator may be configured to switch a mode from a calculation mode for performing calculations to a mode (hereinafter, referred to as an "algorithm mode") for learning algorithms. In addition, as a program for learning algorithms, a simple program is sufficient (hereinafter, a simple program for learning algorithms is simply referred to as a "program").

In the algorithm mode, for example, a user may be able to learn algorithms by displaying an avatar on a display to move the avatar in accordance with an amount of movement and a direction of movement designated by the user, and to draw graphics by a locus of the movement.

However, in the case of moving the avatar displayed on the display by using the above program, there is a case where an ultimate destination of movement is the same as a result, but the direction of movement is different. Conversely, there is a case where the direction of movement is the same but the ultimate destination of movement is different due to the amount of movement being different.

By using such a program, a user can enhance their understanding of algorithms by confirming where the avatar moves to on the display by trial and error, such as changing the amount of movement and the direction of movement in various ways. In this way, a graph function electronic calculator can be used for learning algorithms.

However, the above-described program has the following problems.

Namely, according to the program of this kind, an avatar is moved to an ultimate destination of movement determined by the amount of movement and the direction of movement which are designated by the user, and is displayed on the display. Thereby, the user can ascertain the ultimate destination of movement of the avatar.

However, the user cannot ascertain in detail through what kind of path the avatar has moved to the ultimate destination of movement.

Accordingly, there is a problem that the user, by changing instruction content, such as the amount of movement and the direction of movement, cannot quantitatively ascertain how the movement path of the avatar changes, thereby inhibiting a more detailed understanding of algorithms.

BRIEF SUMMARY OF THE INVENTION

According to an embodiment of the present invention, an electronic device includes a processor and a display. The processor displays, on the display, a display body so as to move the display body from a coordinate value or coordinate values corresponding to a starting position, in which the display body is caused to start to move, to a coordinate value or coordinate values corresponding to a first movement destination in accordance with each movement instruction of a first movement instruction set including one or more movement instructions. The processor records a coordinate value or coordinate values corresponding to a movement by any one of the one or more movement instructions of the first movement instruction set, as a first coordinate value group, in a storage device in accordance with a recording instruction included in the first movement instruction set After recording of the first coordinate value group, the processor returns the display body to the coordinate value or the coordinate values corresponding to the starting position and displays the display body on the display. The processor displays, on the display, the display body so as to move the display body from the coordinate value or the coordinate values corresponding to the starting position to a coordinate value or coordinate values corresponding to a second movement destination in accordance with each movement instruction of a second movement instruction set including one or more movement instructions. The processor records a coordinate value or coordinate values corresponding to a movement by any one of the one or more movement instructions of the second movement instruction set, as a second coordinate value group, in the storage device in accordance with a recording instruction included in the second movement instruction set. The processor displays, on the display, to indicate that each coordinate value included in the second coordinate value group is different from or the same as each coordinate value in a same recording order included in the first coordinate value group.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 6 is a command configuration diagram showing an example of a movement instruction group β created by sequential commands;

FIG. 7A is a schematic diagram showing an example of a display on which an algorithm program corresponding to the movement instruction group β is displayed;

FIG. 7B is a schematic diagram showing an example of a display on which an algorithm program corresponding to the movement instruction group β is displayed;

FIG. 8 is a command configuration diagram showing an example of a movement instruction group γ created by sequential commands;

FIG. 9A is a schematic diagram showing an example of a display on which an algorithm program corresponding to the movement instruction group γ is displayed;

FIG. 9B is a schematic diagram showing an example of a display on which an algorithm program corresponding to the movement instruction group γ is displayed;

FIG. 10A is a command configuration diagram showing an example of a movement instruction group δ created by sequential commands;

FIG. 10B is a command configuration diagram showing an example of a movement instruction group ε created by sequential commands;

FIG. 10C is a command configuration diagram showing an example of a movement instruction group η created by sequential commands;

FIG. 11 is a schematic diagram showing an example of a display on which an avatar moving in accordance with movement instruction groups δ, ε, and η is displayed;

FIG. 16 is a diagram showing a right-angled isosceles triangle in which a direction of movement of an avatar in accordance with the movement instruction group η2 is a hypotenuse;

FIG. 17 is a schematic diagram showing an example of a display on which an algorithm program corresponding to the movement instruction group η2 is displayed;

FIG. 18 is a command configuration diagram showing an example of a movement instruction group η3 created by sequential commands;

DETAILED DESCRIPTION OF THE PREFERRED EMBODIMENTS

Hereinafter, an electronic device, to which a movement path recording method according to an embodiment of the present invention is applied, will be described with reference to the drawings.

Figure 1:
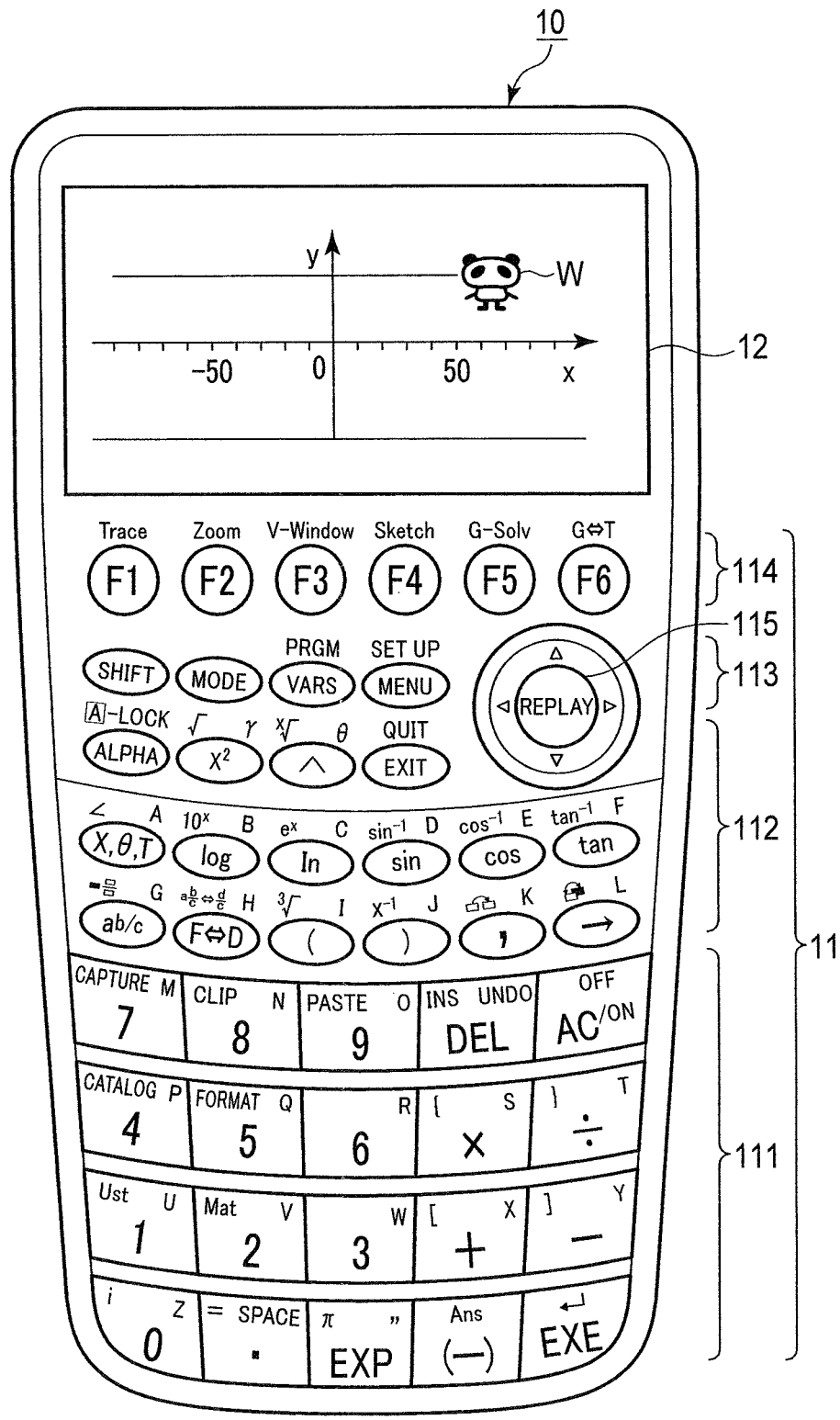
FIG. 1 is a front view showing an appearance configuration of an electronic device to which a movement path recording method according to an embodiment of the present invention is applied.

FIG. 1 is a front view showing an appearance configuration of an electronic device 10 to which the movement path recording method according to the embodiment of the present invention is applied.

FIG. 1 is a diagram showing the case where the electronic device 10 is implemented as a graph function electronic calculator. However, the electronic device 10 is not exclusively configured as a graph function electronic calculator, and can also be configured as a tablet terminal, a personal computer, a smartphone, a mobile telephone, a touch panel type personal digital assistant (PDA), an electronic book, a portable game device, or the like.

Note that an electronic device such as a tablet terminal in which no physical keys (buttons) as in a graph function electronic calculator are mounted displays a software keyboard like keys of a graph function electronic calculator, and executes processing in accordance with a key operation on this software keyboard.

The electronic device 10 configured as a graph function electronic calculator has, for the necessity of its portability, a small size that allows a user to grasp well with one hand and operate with one hand, and is provided with a key input section 11 and a display 12 on a front surface of a main body.

The key input section 11 comprises a numerical/computation symbol key group 111 to input numerical values, numerical expressions, and program instructions, and to instruct calculations and execution of programs, a function faculty key group 112 to input various functions and start a memory function, a setting key group 113 including a mode selection key "MODE" to display a menu screen for various operation modes such as a calculation mode and an algorithm mode and to instruct to set these operation modes, etc., a function key group 114 to start various functions displayed along the lower edge of the display 12 by one key operation, and cursor keys 115 to perform an operation of moving a cursor displayed on the display 12 and an operation of selecting a data item, etc.

[0] to [9] (numerical) keys, [+], [−], [×], and [÷] (four-operation symbol) keys, an [EXE] (execution) key, an [AC] (clear) key, etc. are arranged as the numerical/computation symbol key group 111.

A [sin] (sine) key, a [cos] (cosine) key, a [tan] (tangent) key, etc. are arranged as the function faculty key group 112.

Other than the mode selection key "MODE", a [MENU] (menu) key, a [SHIFT] (shift) key, etc. are arranged as the setting key group 113.

[F1] to [F6] keys are arranged as the function key group 114.

It should be noted that when operated following the operation of the [SHIFT] key, each of the keys of the numerical/computation symbol key group 111, the function faculty key group 112, the setting key group 113, and the function key group 114 does not perform a key function indicated on its key top, but can function as a key indicated in the upper part of the key. For example, if the [AC] key is operated after the operation of the [SHIFT] key (hereinafter, referred to as [SHIFT]+[AC] keys.), the [AC] key serves as an [OFF] (power off) key. [SHIFT]+[NENU] keys serve as a [SET UP] (set up) key, and [SHIFT]+[F3] keys serve as a [V-Window] (view window: instructing to display a drawing region setting screen) key.

The display 12 comprises a dot matrix type liquid crystal display unit. When the electronic device 10 is a tablet terminal, the display 12 comprises a liquid crystal display unit over which a touch panel is provided.

Figure 2:
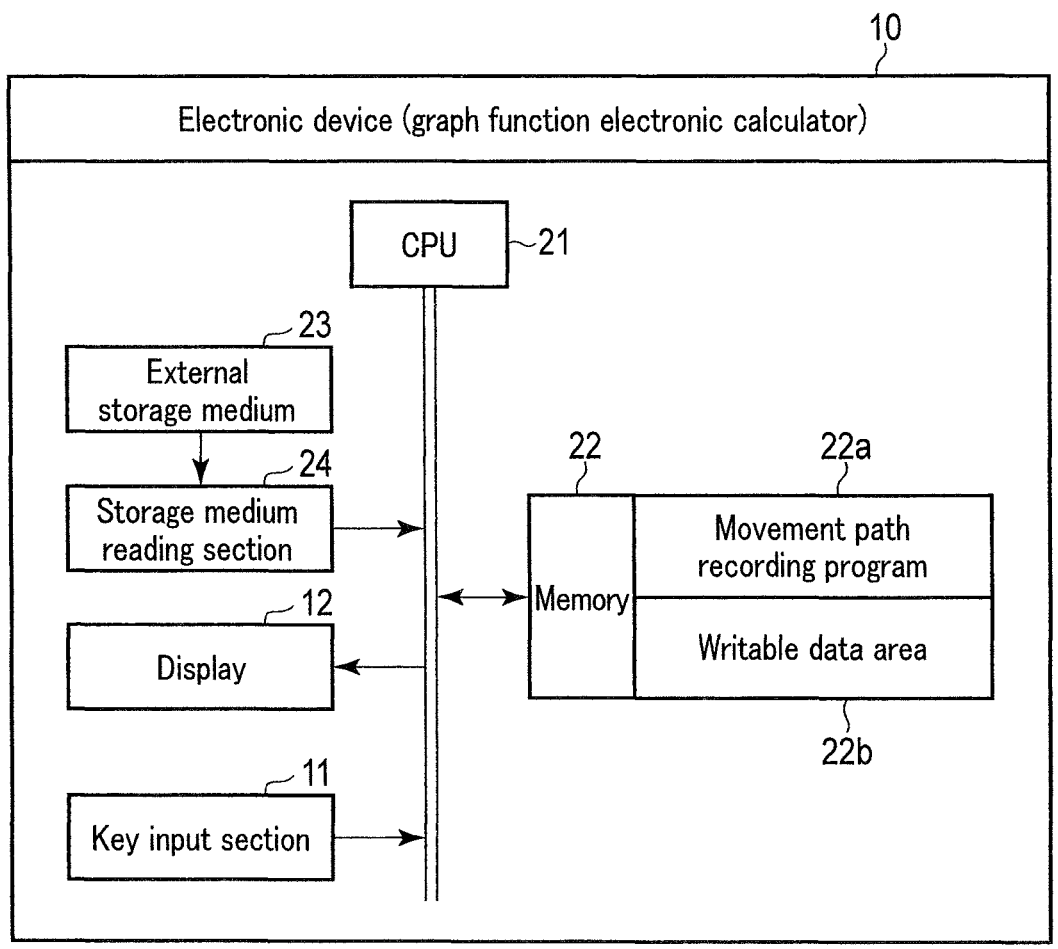
FIG. 2 is a block diagram showing a configuration of an electronic circuit of the electronic device.

FIG. 2 is a block diagram showing a configuration of an electronic circuit of the electronic device 10.

The electronic circuit of the electronic device 10 comprises a CPU 21 that is a computer, a memory 22, and a storage medium reading section 24, in addition to the key input section 11 and the display 12.

The CPU 21 controls the operation of each part of the circuit in accordance with the movement path recording program 22a stored in the memory 22 as a storage device, and executes various kinds of computation processing corresponding to key input signals from the key input section 11. The movement path recording program 22a may be stored in the memory 22 in advance, or may be read and then stored in the memory 22 from an external storage medium 23 such as a memory card via the storage medium reading section 24. The movement path recording program 22a is configured to keep the user from rewriting by the operation of the key input section 11.

Other than the above information unrewritable by the user, a writable data area 22b, as an area to store data rewritable by the user, is secured in the memory 22. The writable data area 22b stores data of key codes input by the key input section 11, data of numerical expressions, table data, and graph data configured accordingly, a coordinate value indicating a position of the avatar (display body) W on the display 12 and recorded by the movement path recording program 22a, and the like.

The electronic device 10 configured as above enables a movement path recording function as will be described later when the CPU 21 controls the operation of each part of the circuit in accordance with an instruction described in the movement path recording program 22a, and software and hardware operate in cooperation with each other.

In an algorithm mode, the movement path recording program 22a receives a command, such as a movement instruction for moving an avatar W displayed on the display 12 and a recording instruction for recording coordinate values during movement. It should be noted that the movement of the avatar W described herein includes not only a general movement, such as moving from a coordinate to another coordinate, but also changing only an orientation (direction of movement) of the avatar W without changing a coordinate value.

Setting of the electronic device 10 to the algorithm mode is performed by pressing the "MODE" key in the setting key group 113. The electronic device 10 also comprises a calculation mode, other than the algorithm mode, and when the "MODE" key is pressed, the calculation mode and the algorithm mode are switched alternately. In addition, the electronic device 10 may be provided with modes other than these modes, and even in a case where three or more modes, by configuring the mode to be sequentially switched every time the "MODE" key is pressed, the user can set a desired mode from these modes.

When setting the mode to the algorithm mode and further activating the movement path recording program 22a, it is capable of receiving a command, such as the above-described movement instruction and recording instruction, from the numerical/computation symbol key group 111.

Figure 3:
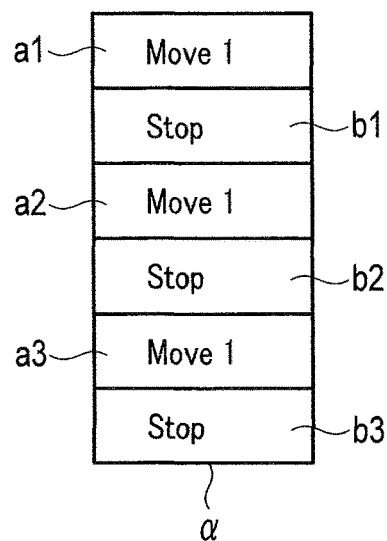
FIG. 3 is a command configuration diagram showing an example of a movement instruction group α created by sequential commands.

FIG. 3 is a diagram showing a command configuration of a movement instruction group α as an example of a movement instruction group (a movement instruction system) created by sequential commands.

In the movement instruction group α, a command "Move 1" has movement instructions a1, a2, and a3 that move a coordinate value of the avatar W by "1" along a predetermined direction (for example, an X-axis direction) on the display 12. In the present embodiment, the direction of movement of the avatar W is set to the X-axis normal direction in an initial state. A command "Stop" has recording instructions b1, b2, and b3 that record a coordinate value of the avatar W at that point in time in the writable data area 22b. The movement instruction group is configured by any number of commands. It should be noted that a command is not limited to a movement instruction and a recording instruction, and as will be described later, also includes a rotation instruction and a repetition instruction.

Returning to FIG. 3, the user creates the movement instruction group α by accumulating commands in such a manner that the user operates the numerical/computation symbol key group 111, after inputting the command "Move 1" as the movement instruction a1, to confirm this input by pressing the "EXE" key, and then after inputting the command "Stop" as the recording instruction b1, to confirm this input by pressing the "EXE" key.

In accordance with the movement instruction group α, the movement path recording program 22a moves a coordinate of the avatar W to display it on the display 12, and records a coordinate value of the avatar W in the writable data area 22b.

For example, in the case of the movement instruction group α, the movement path recording program 22a moves the coordinate value of the avatar W from a current value (an initial position as a position before starting movement) by "1" along the X-axis direction in accordance with the movement instruction a1, and records a coordinate value after movement in the writable data area 22b in accordance with the recording instruction b1. For example, if a coordinate value corresponding to an initial position is an origin point (0, 0), the coordinate values of the avatar W become (1, 0) as a result of moving in accordance with the movement instruction a1, and the coordinate values (1, 0) are recorded in the writable data area 22b as, for example, A=1 and B=0, in accordance with the recording instruction b1. The initial position of the avatar W may be configured to be set in advance, so that the preset initial position will be effective with respect to each movement instruction group as long as the setting of the initial position of the avatar W is not changed after that. Other than this, the initial position of the avatar W may be set every time each movement instruction group is created.

Next, the movement path recording program 22a moves the coordinate values of the avatar W from the current coordinate values (1, 0) by "1" along the X-axis direction in accordance with the movement instruction a2, and records coordinate values (2, 0) after movement in the writable data area 22b as, for example, C=2 and D=0, in accordance with the recording instruction b2.

Furthermore, the movement path recording program 22a moves the coordinate values of the avatar W from the current coordinate values (2, 0) by "1" along the X-axis direction in accordance with the movement instruction a2, and records coordinate values (3, 0) after movement in the writable data area 22b as, for example, E=3 and F=0, in accordance with the recording instruction b3.

Figure 4:
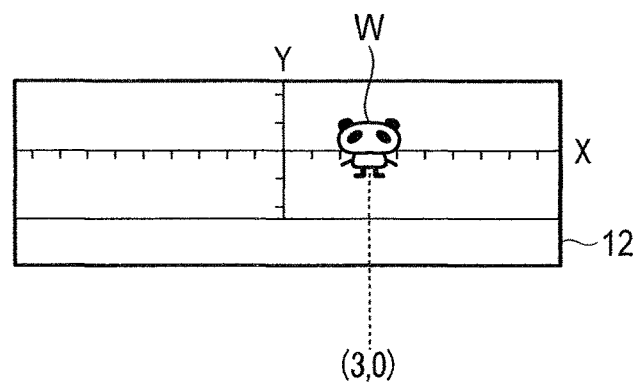
FIG. 4 is a schematic diagram showing an example of a display on which an avatar is displayed.

As described above, when execution of the movement instruction group α is finished, the movement path recording program 22a displays the avatar W positioned at the coordinate values (3, 0) on the display 12 as shown in FIG. 4.

Figure 5:
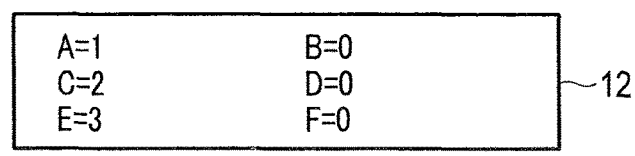
FIG. 5 is a schematic diagram showing an example of a display on which an algorithm program corresponding to the movement instruction group α is displayed.

In addition, the movement path recording program 22a displays values A, B, C, D, E, and F corresponding to the coordinate values recorded in the writable data area 22b on the display 12, like an algorithm program shown in FIG. 5. In FIG. 5, the values A=1 and B=0 correspond to the coordinate values (1, 0) recorded in accordance with the recording instruction b1, the values C=2 and D=0 correspond to the coordinate values (2, 0) recorded in accordance with the recording instruction b2, and the values E=3 and F=0 correspond to the coordinate values (3, 0) recorded in accordance with the recording instruction b3. Thus, from the final values E=3 and F=0, it can be ascertained that the avatar W has moved to the coordinate values (3, 0).

Incidentally, a combination of commands for moving the avatar W at the origin point (0, 0) to the coordinate values (3, 0) is not limited to the one indicated in the movement instruction group α. Accordingly, if the user can create a movement instruction group generated from different commands from those of the movement instruction group α by trial and error so that the user can quantitatively ascertain thereby how the movement path of the avatar W changes, the user will be able to carry out a deeper learning of algorithms through the execution of the movement path recording program 22a. This matter will be described below.

FIG. 6 is a diagram showing a command configuration of a movement instruction group β which is another example of the movement instruction group created by sequential commands.

The movement instruction group β also includes commands created to move the avatar W at the origin point (0, 0) to the coordinate values (3, 0).

According to the movement instruction group β, the movement path recording program 22a ends after the movement instruction a1 "Move 1" and the recording instruction b1 "Stop" before a command "End" as an ending instruction d1 are repeated three times by a command "Repeat 3", which is a repetition instruction c1. That is, it is repeated three times that the coordinate value of the avatar W is moved from the origin point (0, 0) by "1" along the X-axis direction in accordance with the movement instruction a1, and the coordinate value after movement is recorded in the writable data area 22b in accordance with the recording instruction b1.

As described above, after ending the execution of the movement instruction group β as well, the movement path recording program 22a displays the avatar W positioned at the coordinate values (3, 0) on the display 12, as shown in FIG. 4.

In addition, the movement path recording program 22a displays the values A, B, C, D, E, and F recorded in the writable data area 22b on the display 12 while showing a result of comparison with the values A, B, C, D, E, and F recorded by the movement instruction group α executed immediately before, like algorithm programs shown in FIGS. 7A and 7B.

In FIGS. 7A and 7B, the values A=1 and B=0 correspond to the coordinate values (1, 0) of the avatar W moved by the movement instruction a1 in the first-time repetition instruction c1. In addition, the values C=2 and D=0 correspond to the coordinate values (2, 0) of the avatar W moved by the movement instruction a1 in the second-time repetition instruction c1, and also, the values E=3 and F=0 correspond to the coordinate values (3, 0) of the avatar W moved by the movement instruction a1 in the third-time repetition instruction c1.

Furthermore, the algorithm programs shown in FIGS. 7A and 7B display, after the values A, B, C, D, E, and F, the results of comparison with the values (FIG. 5) by the already-executed (for example, executed immediately before) movement instruction group α. The values A, B, C, D, E, and F in FIGS. 7A and 7B are the same as the values A, B, C, D, E, and F in FIG. 5, respectively. Thus, to indicate that fact, "same" is displayed after the values A, B, C, D, E, and F in the algorithm program shown in FIG. 7A. In addition, instead of displaying "same", "(±0)" indicating that a difference is zero may be displayed, like the algorithm program shown in FIG. 7B.

By comparing the position of the avatar W displayed on the display 12 after the movement instruction group α is executed, and the position of the avatar W displayed on the display 12 after the movement instruction group β is executed, the user can confirm that, whichever movement instruction group is executed, the avatar W moves from the origin point (0, 0) to the coordinate values (3, 0).

In addition, although the commands included in the movement instruction group β differ from the commands included in the movement instruction group α, the values A, B, C, D, E, and F of each other are all the same. Thus, the user can also confirm that the avatar W moves from the origin point (0, 0) to the coordinate values (3, 0) through the same path.

To execute the movement instruction group β after execution of the movement instruction group α so as to move the avatar W from the origin point (0, 0) in the same manner as the case of the movement instruction group α, it is necessary to return the position of the avatar W, which has moved to the coordinate values (3, 0) by the execution of the movement instruction group α, to the origin point (0, 0). Thus, when the user operates the numerical/computation symbol key group 111 to start creation of the movement instruction group β, the movement path recording program 22a returns the position of the avatar W, which has moved to the coordinate values (3, 0) by the execution of the movement instruction group α, to the origin point (0, 0) that is a position before movement, and displays the avatar W on the display 12.

Next, an example of a case where a movement destination is the same, but commands are different so that coordinate values recorded in the writable data area 22b are different, will be introduced.

FIG. 8 is a diagram showing an example of such a movement instruction group γ. Commands included in the movement instruction group γ are also for moving the avatar W at the origin point (0, 0) to the coordinate values (3, 0).

According to the movement instruction group γ, the movement path recording program 22a repeats the movement instruction a1 "Move 1" before a command "End", which is the ending instruction d1, three times by a command "Repeat 3", which is the repetition instruction c1. Thereby, the coordinate values of the avatar W become (3, 0). Next, in accordance with the recording instruction 101, the coordinate values (3, 0) are recorded in the writable data area 22b as, for example, A=3 and B=0.

As described above, after ending execution of the movement instruction group γ as well, the movement path recording program 22a displays the avatar W positioned at the coordinate values (3, 0) on the display 12, as shown in FIG. 4.

In addition, the movement path recording program 22a displays the values A and B recorded in the writable data area 22b on the display 12 while indicating results of comparison with the values A and B recorded by the movement instruction group α executed immediately before, like the algorithm programs shown in FIGS. 9A and 9B.

If the movement instruction group γ is executed, the movement path recording program 22a records only the coordinate values (3, 0) of the avatar W after movement in accordance with the recording instruction b1. Thus, like the algorithm programs shown in FIGS. 9A and 9B, the values become A=3 and B=0.

Furthermore, the algorithm programs shown in FIGS. 9A and 9B also display results of comparison with the values (FIG. 5) recorded by the already-executed movement instruction group α after the values A and B. Since the value B in FIGS. 9A and 9B is the same as the value B in FIG. 5, "same" is displayed after the value B to indicate that fact in FIG. 9A. In addition, as shown in FIG. 9B, instead of the display "same", ")±0)" indicating that a difference is zero may be displayed. On the other hand, since the value A=3 in FIGS. 9A and 9B is larger than the value A=1 in FIG. 5, ">" indicating that the value is larger is displayed after the value A in FIG. 9A. In addition, since the value A=3 is larger than the value A=1 by "2", "(+2)" is displayed after the value A=3 to clearly describe that fact in FIG. 9B. Although not shown in the figure, if only a state of being different is indicated without comparing large-and-small, "different" may be displayed instead of ">" in FIG. 9A, for example.

As described above, the movement path recording program 22a moves the position of the avatar W in accordance with a movement instruction included in a movement instruction group, records coordinate values of the avatar W in accordance with a recording instruction included in the movement instruction group, and then, if another movement instruction group is executed, moves the position of the avatar W in accordance with a movement instruction included in the movement instruction group, records coordinate values of the avatar W in accordance with a recording instruction included in the movement instruction group, and also displays the coordinate values while comparing them with the coordinate values recorded during the execution of the previous movement instruction group.

The coordinate values to be compared are not limited to the coordinate values recorded during the execution of the immediately preceding movement instruction group. As long as the coordinate values are recorded in the writable data area 22b, coordinate values recorded during execution of any past movement instruction group can be comparison targets.

In the above descriptions, an example of a relatively simple movement of moving the avatar W along the X-axis direction is described, but the movement path recording program 22a can be applied to a movement instruction group which moves the avatar W more intricately, as will be described below.

As an example thereof, a case of determining a movement instruction group from the shortest algorithm (i.e., the smallest number of commands) for moving the avatar W from the origin point (0, 0) to coordinate values (10, 10) by using the movement path recording program 22a, will be described.

For example, according to movement instruction groups δ, ε, and η including commands as shown in FIGS. 10A, 10B, and 10C, all of them can move the avatar W from the origin point (0, 0) to the coordinate values (10, 10).

According to the movement instruction group δ shown in FIG. 10A, the movement path recording program 22a advances the coordinate value of the avatar W by "10" along the X-axis direction in accordance with "Move 10", which is the movement instruction a1. After that, the movement path recording program 22a records these coordinate values (10, 0) in the writable data area 22b as, for example, A=10 and B=0 in accordance with "Stop", which is the recording instruction b1, and then turns the avatar W counterclockwise by 90° in accordance with "Turn 90°", which is a rotation instruction e1. Thereby, the direction of movement of the avatar W from that point on is the Y-axis direction.

After that, these coordinate values (10, 0) are recorded in the writable data area 22b as, for example, C=10 and D=0 in accordance with the recording instruction b2, and further the coordinate values of the avatar W are advanced by "10" along the Y-axis direction in accordance with "Move 10", which is the movement instruction a2. Thereby, the coordinate values of the avatar W become (10, 10). After that, the coordinate values (10, 10) are recorded in the writable data area 22b as, for example, E=10 and F=10 in accordance with the recording instruction b3.

As described above, according to the movement instruction group δ, the avatar W moves from the origin point (0, 0) to the coordinate values (10, 10) by moving along a path (1) shown in FIG. 11. As shown in FIG. 10A, the movement instruction group δ enables such a movement by six commands.

On the other hand, according to the movement instruction group ε shown in FIG. 10B, the movement path recording program 22a turns the avatar W counterclockwise by 90° in accordance with "Turn 90°", which is the rotation instruction e1. Thereby, the direction of movement of the avatar W from that point on is the Y-axis direction. After that, these coordinate values are recorded in the writable data area 22b in accordance with "Stop", which is the recording instruction b1. At this point in time, the avatar W has not moved yet, and the coordinate values are (0, 0). Thus, the coordinate values are recorded in the writable data area 22b as, for example, A=0 and B=0.

Next, the coordinate values of the avatar W are advanced by "10" along the Y-axis direction in accordance with "Move 10", which is the movement instruction a1. Thereby, the coordinate values of the avatar W become (0, 10). After that, these coordinate values (0, 10) are recorded in the writable data area 22b as, for example, C=0 and D=0 in accordance with the recording instruction b2.

After that, the avatar W is turned clockwise by 90° in accordance with "Turn −90°", which is the rotation instruction e2. Thereby, the direction of movement of the avatar W from that point on is the X-axis direction. After that, the coordinate values of the avatar W are advanced by "10" along the X-axis direction in accordance with "Move 10", which is the movement instruction a2. Thereby, the coordinate values of the avatar W become (10, 10). After that, these coordinate values (10, 10) are recorded in the writable data area 22b as, for example, E=10 and F=10 in accordance with the recording instruction b3.

Thereby, according to the movement instruction group ε, the avatar W moves from the origin point (0, 0) to the coordinate values (10, 10) by moving along a path (2) shown in FIG. 11. As shown in FIG. 10B, the movement instruction group ε enables such a movement by seven commands.

However, if moving along a diagonal line like a path (3) shown in FIG. 11, such a movement can be enabled by the movement instruction group q including four commands as shown in FIG. 10C. Thus, this is the shortest movement. However, it is assumed herein that the user does not know the Pythagorean theorem. In this case, the user does not know how many degrees the avatar W should be turned in the first rotation instruction e1, and how much the avatar W should be moved in the movement instruction a1. Thus, a case where the user executes the movement path recording program 22a while changing the values indicated by "?" in FIG. 10C to determine the values indicated by "?" in FIG. 10C by trial and error will be described.

Figure 12:
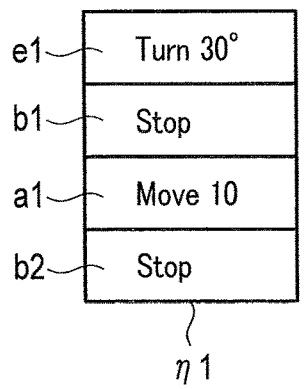
FIG. 12 is a command configuration diagram showing an example of a movement instruction group η1 created by sequential commands.

FIG. 12 is a diagram showing a command configuration of a movement instruction group η1 in the first-time trial. This is a case where "Turn ?" is "Turn 30°", and "Move ?" is "Move 10".

Figure 13:
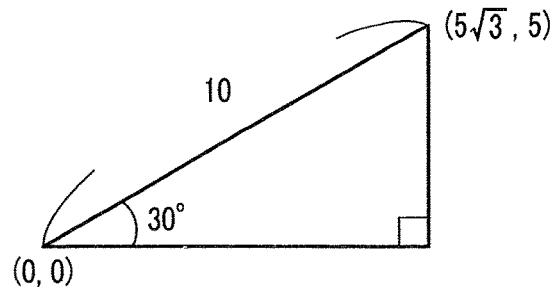
FIG. 13 is a diagram showing a right-angled triangle in which a direction of movement of an avatar in accordance with the movement instruction group η1 is a hypotenuse.

According to the movement instruction group η1 shown in FIG. 12, the movement path recording program 22a turns the avatar W counterclockwise by 30° in accordance with "Turn 30°", which is the rotation instruction e1. Thereby, the advancing direction of the avatar W from that point on is a hypotenuse direction of a right-angled triangle as shown in FIG. 13. After that, these coordinate values are recorded in the writable data area 22b in accordance with "Stop", which is the recording instruction b1. At this point in time, the avatar W has not moved yet, and thus the coordinate values are (0, 0). Thus, the coordinate values (0, 0) are recorded in the writable data area 22b as, for example, A=0 and B=0.

Next, the coordinate values of the avatar W are advanced by "10" along the hypotenuse direction of the right-angled triangle shown in FIG. 13 in accordance with "Move 10", which is the movement instruction a1. Thereby, the coordinate values of the avatar W become (5√3, 5). After that, these coordinate values (5√3, 5) are recorded in the writable data area 22b as, for example, C=5√3 and D=5 in accordance with the recording instruction b2.

Figure 14:
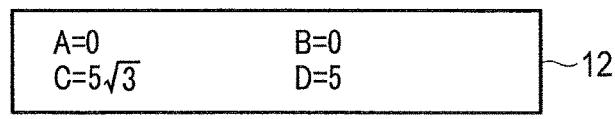
FIG. 14 is a schematic diagram showing an example of a display on which an algorithm program corresponding to the movement instruction group η1 is displayed.

Thereby, the movement path recording program 22a displays the avatar W positioned at the coordinate values (5√3, 5) on the display 12. In addition, the movement path recording program 22a displays on the display 12 in a manner such as an algorithm program shown in FIG. 14, the coordinate values recorded in the writable data area 22b. In FIG. 14, the values A=0 and B=0 correspond to the coordinate values recorded in accordance with the recording instruction b1, and the values C=5√3 and D=5 correspond to the coordinate values recorded in accordance with the recording instruction b2.

The user ascertains that the avatar W has not moved to the coordinate values (10, 10) from the position of the avatar W displayed on the display 12 and the values C=5√3 and D=5 corresponding to the final coordinate values indicated in the algorithm program shown in FIG. 14, and performs the second-time trial.

Figure 15:
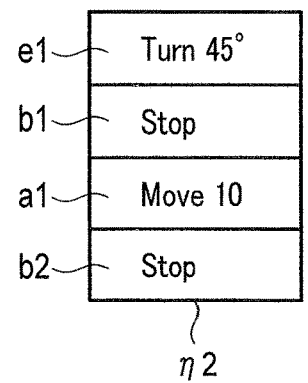
FIG. 15 is a command configuration diagram showing an example of a movement instruction group η2 created by sequential commands.

FIG. 15 is a diagram showing a command configuration of a movement instruction group η2 in the second-time trial. This is a case where "Turn ?" is "Turn 45°", and "Move ?" is "Move 10".

According to the movement instruction group η2 shown in FIG. 15, the movement path recording program 22a turns the avatar W counterclockwise by 45° in accordance with "Turn 45°", which is the rotation instruction e1. Thereby, the direction of movement of the avatar W from that point on is a hypotenuse direction of a right-angled isosceles triangle as shown in FIG. 16. After that, these coordinate values are recorded in the writable data area 22b in accordance with "Stop", which is the recording instruction b1. At this point in time, since the avatar W has not moved yet and the coordinate values are (0, 0), the coordinate values are recorded in the writable data area 22b as, for example, A=0 and B=0.

Next, the coordinate values of the avatar W are advanced by "10" along the hypotenuse direction of the right-angled isosceles triangle shown in FIG. 16 in accordance with "Move 10", which is the movement instruction a1. Thereby, the coordinate values of the avatar W become (5√2, 5√2). After that, these coordinate values (5√2, 5√2) are recorded in the writable data area 22b as, for example, C=5√2 and D=5√2 in accordance with the recording instruction b2.

Thereby, the movement path recording program 22a displays the avatar W positioned at the coordinate values (5√2, 5√2) on the display 12. In addition, the movement path recording program 22a displays the coordinate values recorded in the writable data area 22b on the display 12 like an algorithm program shown in FIG. 17. In FIG. 17, the values A=0 and B=0 correspond to the coordinate values recorded in accordance with the recording instruction b1, and the values C=5√2 and D=5√2 correspond to the coordinate values recorded in accordance with the recording instruction b2. The algorithm program shown in FIG. 17 displays, after the values A, B, C, and D, results of comparison with the values (see FIG. 14) recorded in the first-time trial executed immediately before.

The user ascertains that the avatar W has not moved to the coordinate values (10, 10) yet from the position of the avatar W displayed on the display 12 and the values C=5√2 and D=5√2 corresponding to the final coordinate values of the algorithm program shown in FIG. 17, and performs the third-time trial.

FIG. 18 is a diagram showing a command configuration of a movement instruction group η3 in the third-time trial. This is a case where "Turn ?" is "Turn 45°", and "Move ?" is "Move 10√2".

Figures 19, 20:
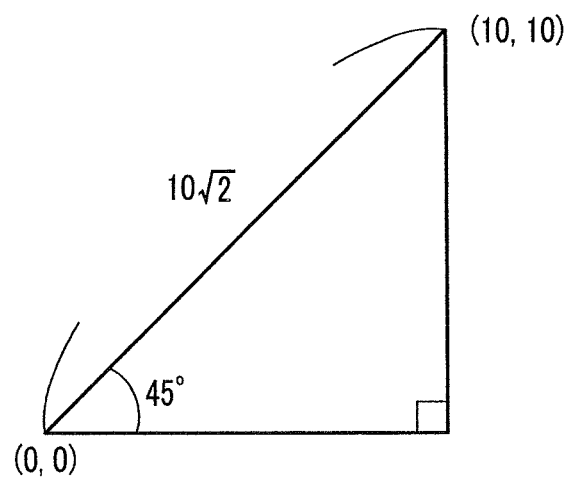
FIG. 19 is a diagram showing a right-angled isosceles triangle in which a direction of movement of an avatar in accordance with the movement instruction group η3 is a hypotenuse.
FIG. 20 is a schematic diagram showing an example of a display on which an algorithm program corresponding to the movement instruction group η3 is displayed.

According to the movement instruction group η3 shown in FIG. 18, the movement path recording program 22a turns the avatar W counterclockwise by 45° in accordance with "Turn 45°", which is the rotation instruction e1. Thereby, the direction of movement of the avatar W from that point on is a hypotenuse direction of a right-angled isosceles triangle as shown in FIG. 19. After that, these coordinate values are recorded in the writable data area 22b in accordance with "Stop", which is the recording instruction b1. At this point in time, the avatar W has not moved yet, and thus the coordinate values are (0, 0). Thus, the coordinate values are recorded in the writable data area 22b as, for example, A=0 and B=0.

Subsequently, the coordinate values of the avatar W are advanced by "10√2" along the hypotenuse direction of the right-angled isosceles triangle shown in FIG. 19 in accordance with "Move 10√2", which is the movement instruction a1. Thereby, the coordinate values of the avatar W become (10, 10). After that, these coordinate values (10, 10) are recorded in the writable data area 22b as, for example, C=10 and D=10 in accordance with the recording instruction b2.

Thereby, the movement path recording program 22a displays the avatar W positioned at the coordinate values (10, 10) on the display 12. In addition, the movement path recording program 22a displays the values recorded in the writable data area 22b on the display 12 like an algorithm program shown in FIG. 20. In FIG. 20, the values A=0 and B=0 correspond to the coordinate values recorded in accordance with the recording instruction b1, and the values C=10 and D=10 correspond to the coordinate values recorded in accordance with the recording instruction b2. The algorithm program shown in FIG. 20 also displays, after the values A, B, C, and D, results of comparison with the values (see FIG. 17) recorded in the second-time trial executed immediately before.

The user ascertains that the avatar W has moved to the coordinate values (10, 10) from the position of the avatar W displayed on the display 12 and the values C=10 and D=10 corresponding to the final coordinate values of the algorithm program shown in FIG. 20.

As described above, the movement path recording program 22a can be applied to a movement instruction group which moves the avatar W more intricately, and thus can also be applied for learning of the Pythagorean theorem, for example.

Figure 21:
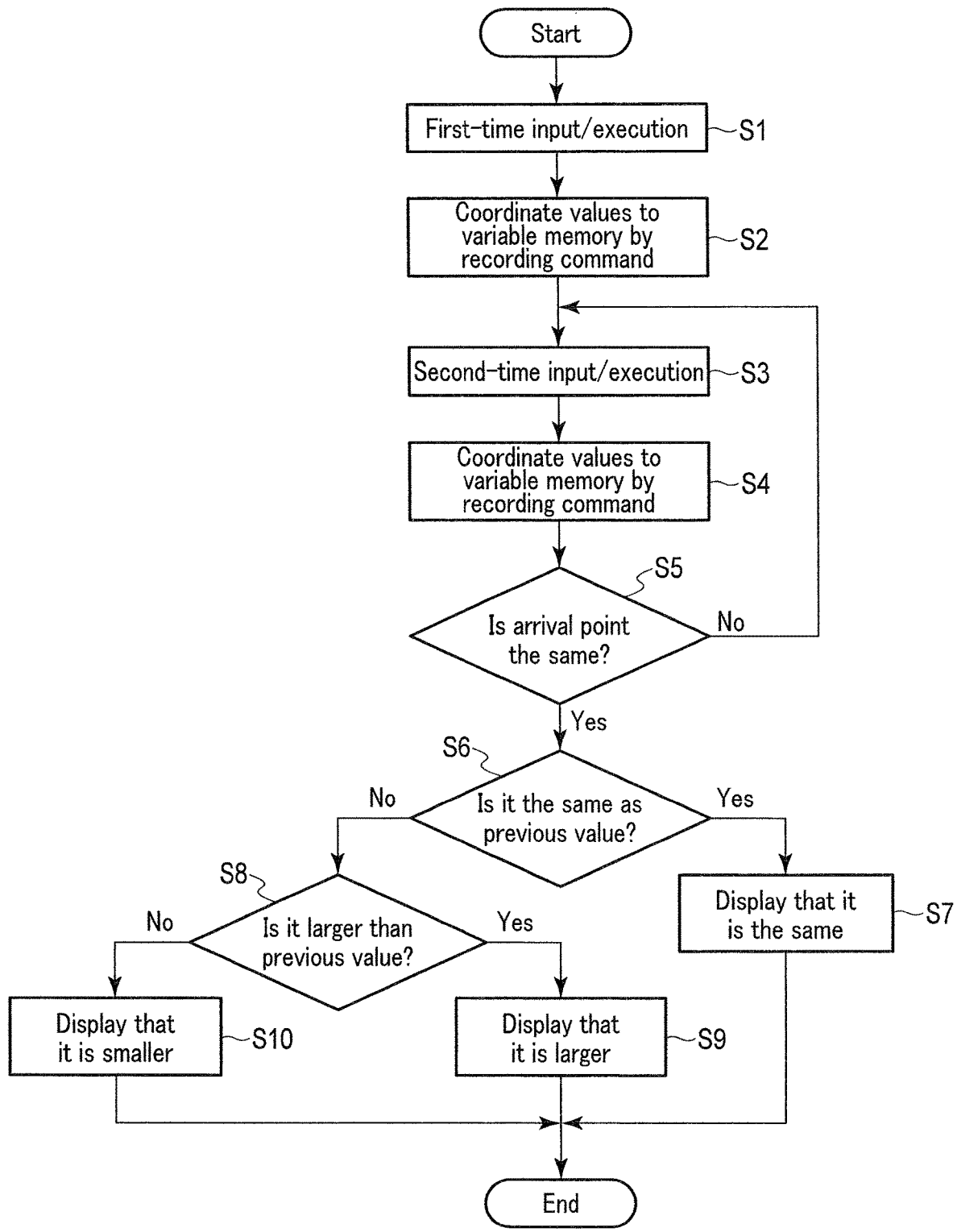
FIG. 21 is a flowchart showing an operation of the electronic device to which the movement path recording method according to the embodiment of the present invention is applied.

Subsequently, the operation of the electronic device 10, to which the movement path recording method according to the embodiment of the present invention configured as above is applied, will be described by using a flowchart shown in FIG. 21.

When learning programming by the electronic device 10, it is necessary to first set the mode of the electronic device 10 to an algorithm mode. This can be set by a user pressing the "MODE" key in the setting key group 113 to switch the mode to the algorithm mode.

When the mode is set to the algorithm mode and the movement path recording program 22a is also activated, the user can input commands, such as a movement instruction and a recording instruction for moving the avatar W, from the numerical/computation symbol key group 111.

In the following, an example in which the movement instruction group α as shown in FIG. 3 is created, and the movement path recording program 22a is executed in accordance with the movement instruction group α will be described.

The user operates the numerical/computation symbol key group 111 to input a command "Move 1", which is the movement instruction a1, and then presses the "EXE" key to confirm this input. Next, the user inputs a command "Stop", which is the recording instruction b1, and then presses the "EXE" key to confirm this input. In this way, by inputting and confirming the necessary commands, the movement instruction group α is created. Then, the movement path recording program 22a is executed in accordance with the movement instruction group α (S1).

By the movement path recording program 22a being executed in accordance with the movement instruction a1, the coordinate values of the avatar W are moved by "1" along the X-axis direction from the origin point (0, 0) that is the initial position, and the coordinate values (1, 0) after the movement are recorded in the writable data area 22b as, for example, A=1 and B=0, in accordance with the recording instruction b1. Next, the coordinate values of the avatar W are moved from the current coordinate values (1, 0) by "1" along the X-axis direction in accordance with the movement instruction a2, and the coordinate values (2, 0) after movement are recorded in the writable data area 22b as, for example, C=2 and D=0 in accordance with the recording instruction b2. Furthermore, the coordinate values of the avatar W are moved from the current coordinate values (2, 0) by "1" along the X-axis direction in accordance with the movement instruction a3, and the coordinate values (3, 0) after movement are recorded in the writable data area 22b as, for example, E=3 and F=0 in accordance with the recording instruction b3 (S2).

Thereby, when the execution of the movement instruction group α ends, the avatar W positioned at the coordinate values (3, 0) is displayed on the display 12 as shown in FIG. 4. In addition, like the algorithm program shown in FIG. 5, the coordinate values recorded in the writable data area 22b are displayed on the display 12.

From these displays, the user can confirm that the avatar W has moved from the origin (0, 0) to the coordinate values (3, 0).

However, commands for moving the avatar W at the origin point (0, 0) to the coordinate values (3, 0) are not limited to the commands as indicated in the movement instruction group α. Therefore, it is assumed that the user next considers a movement instruction group which moves the avatar W in the same manner by fewer commands.

Thus, it is assumed that the user creates the movement instruction group β as shown in FIG. 6 by trial and error. The movement instruction group β is input by the user operating the numerical/computation symbol key group 111, as described in step S1. Then, the movement path recording program 22a is executed in accordance with the movement instruction group β (S3).

When the movement path recording program 22a is executed in accordance with the movement instruction group β, in accordance with the repetition instruction c1, the program ends after the movement instruction a1 and the recording instruction b1 are repeated three times before the ending instruction d1. Namely, the following processes are repeated three times: the coordinate values of the avatar W are moved from the origin point (0, 0), which is the initial position, by "1" along the X-axis direction in accordance with the movement instruction a1, and the coordinate values after movement are recorded in the writable data area 22b in accordance with the recording instruction b1 (S4).

In this way, after ending the execution of the movement instruction group β as well, the avatar W positioned at the coordinate values (3, 0) is displayed on the display 12, as shown in FIG. 4. In addition, like the algorithm programs shown in FIGS. 7A and 7B, the coordinate values recorded in the writable data area 22b are displayed on the display 12. The user can confirm that, also by the movement instruction β, the position of the avatar W has also moved from the coordinate values (0, 0) to the coordinate values (3, 0) in the same manner as the movement instruction group α, from E=3 and F=0 corresponding to the final coordinate values (S5).

If, by the movement instruction group β, the position has not moved to the same coordinate values as those of the movement by the movement instruction group α (S5: No), the process returns to step S3 so that the user can input another movement instruction group.

On the other hand, if, by the movement instruction group β, the position has moved to the same coordinate values as those of the movement by the movement instruction group α (S5: Yes), by comparing the values A, B, C, D, E, and F recorded in the writable data area 22b by the execution of the movement instruction group β with the values A, B, C, D, E, and F recorded in the writable data area 22b by the movement instruction group α executed immediately before, a difference in movement of the avatar W between the movement instruction group α and the movement instruction group β can be ascertained in more detail.

As shown in FIGS. 7A and 7B, the results of comparison with the values A, B, C, D, E, and F (FIG. 5) recorded by the movement instruction group α are displayed after the values A, B, C, D, E, and F. After the values A, B, C, D, E, and F in FIG. 7A, "same" is displayed. This indicates that the values A, B, C, D, E, and F recorded in the writable data area 22b by the execution of the movement instruction group β are the same as the values A, B, C, D, E, and F recorded in the writable data area 22b by the execution of the movement instruction group α, respectively (S6: Yes, S7). Instead of "same", "(±0)" indicating that a difference is zero may be displayed as shown in FIG. 7B.

The above shows an example in which the exact same values are recorded by the movement instruction group α and the movement instruction group β, but there is a movement instruction group, like the movement instruction group γ shown in FIG. 8, which can move the avatar W to the same position but in which the values recorded in the writable data area 22b are different from those of the case of the movement instruction group α.

As described above, when the movement path recording program 22a is executed in accordance with the movement instruction group γ, the values A=3 and B=0 are recorded in the writable data area 22b like the algorithm programs shown in FIGS. 9A and 9B. In addition, in the algorithm programs shown in FIGS. 9A and 9B, the results of comparison with the values (FIG. 5) recorded by the movement instruction group α are displayed after the values A and B.

The value A=3 by the movement instruction group γ is larger by 2 than the value A=1 by the movement instruction group α (S6: No, S8; Yes). Thus, that effect is notified by ">" in FIG. 9A, and by "(+2)" in FIG. 9B (S9). On the other hand, the value B=0 by the movement instruction group γ is the same as the value B=0 by the movement instruction group α (S6: Yes). Thus, that effect is notified by "same" in FIG. 9A and by "(±0)" in FIG. 9B (S7).

Although an example is omitted, if a value is smaller than a value by a movement instruction group executed immediately before (S8: No), that effect is notified by displaying "<" or "(−2)" (if smaller by 2) after a corresponding value (S10).

In the above example, a movement instruction group to be compared is a movement instruction group executed immediately before. However, as long as coordinate values are recorded in the writable data area 22b, the movement instruction group is not limited thereto, and any movement instruction group executed in the past can be a comparison target.

As described above, according to the electronic device 10 to which the movement path recording method according to the embodiment of the present invention is applied, a position of the avatar W can be moved in accordance with a movement instruction included in a movement instruction group, and coordinate values of the avatar W can be recorded in accordance with a recording instruction included in the movement instruction group. Furthermore, if another movement instruction group is executed, the position of the avatar W is moved in accordance with a movement instruction included in the movement instruction group, and the coordinate values of the avatar W can be recorded in accordance with a recording instruction included in the movement instruction group, and the coordinate values can be displayed while being compared with the coordinate values recorded during execution of the previous movement instruction group.

The coordinate values to be compared are not limited to the coordinate values recorded during the execution of the immediately preceding movement instruction group, and coordinate values recorded during execution of any past movement instruction group can be comparison targets as long as the coordinate values are recorded in the writable data area 22b.

This enables the user to compare coordinate values recorded in accordance with commands, with coordinate values recorded in accordance with previous commands so that the user can learn algorithms more deeply. Furthermore, it is possible to be applied to mathematics education, such as learning of the Pythagorean theorem.

Incidentally, in the above-described embodiment, the coordinate values to be recorded are recorded in the writable data area 22b of the memory 22, but the present invention is not limited thereto. The electronic device 10 may record coordinate values to be recorded in an externally provided storage device. For example, the electronic device 10 may be connected to a network wirelessly or by wire, and may record coordinate values to be recorded in a server provided on this network. Other than the above, the externally provided storage device may be any device which can be provided with a function of recording coordinate values to be recorded, for example, a personal computer provided on a network such as the Internet.

The invention of the present application is not limited to each embodiment, and, at the stage of implementation, can be variously modified without departing from the spirit thereof. Furthermore, inventions at various stages are included in each embodiment, and various inventions can be extracted by a suitable combination of disclosed structural requirements. For example, when the problems described in the section BACKGROUND OF THE INVENTION can be solved, and the advantageous effects described in the section BRIEF SUMMARY OF THE INVENTION can be obtained even if some of all the structural requirements shown in each embodiment are eliminated, or several structural requirements are combined in a different form, a configuration in which those structural requirements are eliminated or combined can be extracted as an invention.

What is claimed is:

1. An electronic device comprising:
   a processor; and
   a display,
   wherein the processor is selectively operable in a plurality of modes including a calculation mode for performing calculations and an algorithm mode for assisting a user in learning algorithms, wherein the algorithm mode for assisting a user in learning algorithms is a mode in which a user is assisted in learning algorithms by displaying a display body on the display and moving the display body in accordance with an amount of movement and a direction of movement designated by the user,
   wherein, in a case in which the processor receives an instruction to operate in the algorithm mode, the processor:
   displays, on the display, the display body so as to move the display body from a coordinate value or coordinate values corresponding to a starting position, at which the display body is caused to start to move, to a coordinate value or coordinate values corresponding to a first movement destination, in accordance with each movement instruction of a first movement instruction set including a plurality of movement instructions;

records a coordinate value or coordinate values corresponding to a movement by any one of the plurality of movement instructions of the first movement instruction set, as a first coordinate value group, in a storage device in accordance with a recording instruction included in the first movement instruction set;

displays, on the display, the display body so as to move the display body from the coordinate value or the coordinate values corresponding to the starting position to a coordinate value or coordinate values corresponding to a second movement destination, in accordance with each movement instruction of a second movement instruction set including a plurality of movement instructions;

records a coordinate value or coordinate values corresponding to a movement by any one of the plurality of movement instructions of the second movement instruction set, as a second coordinate value group, in the storage device in accordance with a recording instruction included in the second movement instruction set; and displays, on the display, an indicator to indicate that each coordinate value included in the second coordinate value group is different from or the same as each coordinate value in a same recording order included in the first coordinate value group.

2. The electronic device according to claim 1, wherein the processor displays, on the display, each coordinate value included in the first coordinate value group and each coordinate value included in the second coordinate value group while displaying the indicator indicating that each coordinate value included in the first coordinate value group is different from or the same as each coordinate value in the same recording order included in the second coordinate value group.

3. The electronic device according to claim 1, wherein the processor compares each coordinate value included in the second coordinate value group and each coordinate value in the same recording order included in the first coordinate value group, and displays a result of the comparison on the display.

4. The electronic device according to claim 1, wherein the processor executes recording of the first or second coordinate value group into the storage device during execution or upon completion of a movement process from the starting position to the first or second movement destination.

5. The electronic device according to claim 1, wherein the first movement instruction set is different from the second movement instruction set.

6. The electronic device according to claim 5, wherein the first coordinate value group is recorded, and then the second coordinate value group is recorded, in the storage device.

7. The electronic device according to claim 1, wherein the coordinate value or coordinate values corresponding to the first movement destination are the same as the coordinate value or coordinate values corresponding to the final second movement destination.

8. The electronic device according to claim 1, wherein when displaying the indicator to indicate a state of being different, the processor displays the indicator so as to indicate a relative largeness and smallness of a coordinate value included in the first coordinate value group and a coordinate value in the same recording order included in the second coordinate value group.

9. The electronic device according to claim 1, further comprising a memory as the storage device.

10. The electronic device according to claim 1, wherein the storage device is provided externally and the electronic device is connected thereto.

11. The electronic device according to claim 1, wherein the display body is an avatar.

12. A movement path recording method of a display body, the method, executed by a processor, comprising:

selectively operating in a plurality of modes including a calculation mode for performing calculations and an algorithm mode for assisting a user in learning algorithms, wherein the algorithm mode for assisting a user in learning algorithms is a mode in which a user is assisted in learning algorithms by displaying a display body on a display and moving the display body in accordance with an amount of movement and a direction of movement designated by the user; and in a case in which the processor receives an instruction to operate in the algorithm mode:

displaying, on a display, the display body so as to move the display body from a coordinate value or coordinate values corresponding to a starting position, at which the display body is caused to start to move, to a coordinate value or coordinate values corresponding to a first movement destination, in accordance with each movement instruction of a first movement instruction set including a plurality of movement instructions;

recording, in a storage device, a coordinate value or coordinate values corresponding to a movement by any one of the plurality of movement instructions of the first movement instruction set, as a first coordinate value group, in accordance with a recording instruction included in the first movement instruction set;

displaying, on the display, the display body so as to move the display body from the coordinate value or the coordinate values corresponding to the starting position to a coordinate value or coordinate values corresponding to a second movement destination, in accordance with each movement instruction of a second movement instruction set including a plurality of movement instructions;

recording, in the storage device, a coordinate value or coordinate values corresponding to a movement by any one of the plurality of movement instructions of the second movement instruction set, as a second coordinate value group, in accordance with a recording instruction included in the second movement instruction set; and comparing each coordinate value included in the first coordinate value group with each coordinate value in a same recording order included in the second coordinate value group, and displaying, based on a result of the comparison, an indicator on the display to indicate that each coordinate value included in the second coordinate value group is different from or the same as each coordinate value in the same recording order included in the first coordinate value group.

13. The movement path recording method according to claim 12, wherein the first movement instruction set is different from the second movement instruction set.

14. The movement path recording method according to claim 13, wherein the first coordinate value group is recorded, and then the second coordinate value group is recorded, in the storage device.

15. The movement path recording method according to claim 12, wherein the coordinate value or coordinate values corresponding to the first movement destination are the same as the coordinate value or coordinate values corresponding to the second movement destination.

16. The movement path recording method according to claim 12, wherein when displaying the indicator to indicate a state of being different, the indicator is displayed to indicate a relative largeness and smallness of a coordinate value included in the first coordinate value group and a coordinate value in the same recording order included in the second coordinate value group.

17. A non-transitory computer-readable storage medium having stored thereon a program that is executable by a computer to cause the computer to perform functions comprising:
- a function of selectively operating in a plurality of modes including a calculation mode for performing calculations and an algorithm mode for assisting a user in learning algorithms, wherein the algorithm mode for assisting a user in learning algorithms is a mode in which a user is assisted in learning algorithms by displaying a display body on a display and moving the display body in accordance with an amount of movement and a direction of movement designated by the user; and
- in a case in which the computer receives an instruction to operate in the algorithm mode:
- a function of displaying, on a display, the display body so as to move the display body from a coordinate value or coordinate values corresponding to a starting position, at which the display body is caused to start to move, to a coordinate value or coordinate values corresponding to a first movement destination, in accordance with each movement instruction of a first movement instruction set including a plurality of movement instructions;
- a function of recording, in a storage device, a coordinate value or coordinate values corresponding to a movement by any one of the plurality of movement instructions of the first movement instruction set, as a first coordinate value group, in accordance with a recording instruction included in the first movement instruction set;
- a function of displaying, on the display, the display body so as to move the display body from the coordinate value or coordinate values corresponding to the starting position to a coordinate value or coordinate values corresponding to a second movement destination, in accordance with each movement instruction of a second movement instruction set including a plurality of movement instructions;
- a function of recording, in the storage device, a coordinate value or coordinate values corresponding to a movement by any one of the plurality of movement instructions of the second movement instruction set, as a second coordinate value group, in accordance with a recording instruction included in the second movement instruction set; and
- a function of comparing each coordinate value included in the first coordinate value group with each coordinate value in a same recording order included in the second coordinate value group, and displaying on the display an indicator to indicate that each coordinate value included in the second coordinate value group is different from or the same as each coordinate value in the same recording order included in the first coordinate value group.

18. The non-transitory computer-readable storage medium according to claim 17, wherein the first movement instruction set is different from the second movement instruction set.

19. The non-transitory computer-readable storage medium according to claim 18, wherein the program is executable by the computer to cause the computer to record the first coordinate value group, and then record the second coordinate value group, in the storage device.

20. The non-transitory computer-readable storage medium according to claim 17, wherein the coordinate value or coordinate values corresponding to the first movement destination are the same as the coordinate value or coordinate values corresponding to the second movement destination.

21. The computer-readable storage medium according to claim 17, wherein when displaying the indicator to indicate a state of being different, the indicator is displayed to indicate a relative largeness and smallness of a coordinate value included in the first coordinate value group and a coordinate value in the same recording order included in the second coordinate value group.

* * * * *